(12) United States Patent
Fleeson

(10) Patent No.: US 6,353,846 B1
(45) Date of Patent: Mar. 5, 2002

(54) PROPERTY BASED RESOURCE MANAGER SYSTEM

(75) Inventor: James M. Fleeson, Waldorf, MD (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/184,806

(22) Filed: Nov. 2, 1998

(51) Int. Cl.[7] ................................................ G06F 9/00
(52) U.S. Cl. ...................... 709/104; 709/315; 709/316
(58) Field of Search ............................ 709/100, 101, 709/104, 107, 202, 203, 217, 218, 223, 224, 226, 227, 315, 317, 330; 707/10, 103; 717/1, 5

(56) References Cited

U.S. PATENT DOCUMENTS

| | | | |
|---|---|---|---|
| 5,297,279 A | 3/1994 | Bannon et al. | |
| 5,390,330 A | 2/1995 | Talati | |
| 5,406,477 A | 4/1995 | Harhen | |
| 5,421,015 A | * 5/1995 | Khoyi et al. | ................. 709/107 |
| 5,437,027 A | 7/1995 | Bannon et al. | |
| 5,446,842 A | 8/1995 | Schaeffer et al. | |
| 5,448,727 A | 9/1995 | Annevelink | |
| 5,450,317 A | 9/1995 | Lu et al. | |
| 5,457,797 A | 10/1995 | Butterworth et al. | |
| 5,510,998 A | 4/1996 | Woodruff et al. | |
| 5,583,983 A | 12/1996 | Schmitter | |
| 5,604,892 A | 2/1997 | Nuttall et al. | |
| 5,608,727 A | * 3/1997 | Perreault et al. | ............ 370/462 |
| 5,634,124 A | * 5/1997 | Khoyi et al. | ................. 707/103 |
| 5,634,133 A | 5/1997 | Kelley | |
| 5,677,997 A | 10/1997 | Talatik | |
| 5,701,400 A | 12/1997 | Amado | |
| 5,754,738 A | 5/1998 | Saucedo et al. | |
| 5,787,283 A | 7/1998 | Chin et al. | |
| 6,247,056 B1 | * 7/2001 | Chou et al. | ................. 709/229 |

* cited by examiner

Primary Examiner—Majid A. Banankhah
(74) Attorney, Agent, or Firm—Akerman Senterfitt

(57) ABSTRACT

A property based decision support system for allocating existing resources to implement a functional unit. The system includes a plurality of resource modules, each providing a component function for implementing a portion of the functional unit and having a set of properties associated therewith. A resource module property object is provided for defining a set of properties for each of the plurality of resource modules and an evaluation expression for each of the properties. A link object defines a set of required modules having required properties associated therewith which are necessary to implement the functional unit. A resource management processor is responsive to a user request for accessing the resource module property object and the link object, and processing the evaluation expression to compare the required properties of each of the required modules to the properties of the plurality of resource modules to determine if the properties of the plurality of resource modules are sufficient to implement functional unit. The processor allocates the resource modules to the functional unit in accordance with the set of required modules defined by the link object if the evaluation expression for each of the required properties is satisfied.

25 Claims, 15 Drawing Sheets

LINKS EDITOR

| LINKS | PARAMETERS | MODULES |

LINK NAME:
Civil Fire ▽

NEEDED MODULES
- ⊟ ▤ SOFTWARE DEFINABLE RADIO
  - ▤ MODEM
  - ▤ MSG PROC
  - ▤ LINK PROC
  - ▤ ANTENNA
  - ▤ RF
  - ⊟ ▤ INFO SPEC
    - ▤ DSP

[i] PROPERTIES:

| NAME | VALUE |
|---|---|
| ☐ Element | |
| ☑ Freq High | 40000 |
| ☑ Freq Low | 30000 |
| ☑ IsAvailable | TRUE |
| ☑ ModuleType | RF |
| ☑ PercentageUsed | 100 |
| ☐ Processor Speed | |
| ☐ Processor Type | |
| ☐ Serial Speed | |
| ☐ Status Mode | |

APPLY PROPERTIES

CLOSE

FIG. 6

GLOSSARY EDITOR

GLOSSARY PAGE EDITOR | PROPERTIES EDITOR | PARAMETER EDITOR | GLOSSARY NOTES

GLOSSARY PAGES:
- BOOLEAN
- CHANNEL_TYPE
- DataType
- FREQ_MODE
- MODE
- MODULATION
- MODULE_REPORTING
- MODULE_STATUS
- MODULE_TYPE
- ModuleType
- NET_ID
- PRECEDENCE
- PWD_MODE
- Receiver Types
- RelationalOperators
- RFM TYPES
- SA_MODE
- SIP_DATA_RATE
- SIP_FUNCTION
- SIP_NET_MODE
- TEXT_MODE

PAGE NAME: [ ]

[NEW PAGE] [DELETE PAGE]

[I] PAGE DEFINITIONS:

| LABEL | VALUE |
|---|---|
| Digital Slot | 105 |
| Radio Slot | 108 |
| RFM CONTROLLER | 109 |
| JIC | 113 |
| CTIC | 114 |
| POPCORN | 115 |
| Channel | 116 |
| Serial Port | 117 |
| Headset/Mic | 118 |
| Transmitter | 110 |
| Receiver | 111 |
| RF | 119 |
| MODEM | 120 |
| ANTENNA | 112 |
| LINK PROC | 121 |
| MSG PROC | 122 |
| SOFTWARE DEFINABLE RADIO | 123 |
| SECURITY PROC | 124 |

LABEL: RF           VALUE: 119

[NEW] [CHANGE] [DELETE]
[SAVE] [SYNCHRONIZE] [CLOSE]

FIG. 7

GLOSSARY EDITOR

GLOSSARY PAGE EDITOR | PROPERTIES EDITOR | PARAMETER EDITOR | GLOSSARY NOTES

| NAME | ID | DATA TYPE | EVALUATION | ALLOCATION | DEALLOCATION | DISCRETE PAGE |
|---|---|---|---|---|---|---|
| ModuleType | 0 | DISCRETE | M(0)==L(0) | | | ModuleType |
| Element | 1 | LONG | M(1)==L(1) | | | N/A |
| IsAvailable | 2 | DISCRETE | M(2)==L(2) | | | BOOLEAN |
| PercentageUsed | 3 | LONG | M(3)+L(3)<=100 | M(3)+M(3)+... | M(3)=M(3)-... | N/A |
| Freq High | 4 | LONG | M(4)>=L(4) | | | N/A |
| Freq Low | 5 | LONG | M(5)<=L(5) | | | N/A |
| Processor Type | 6 | BYTE | | | | N/A |
| Serial Speed | 7 | BYTE | | | | N/A |
| Processor Speed | 8 | BYTE | | | | N/A |
| Status Mode | 8 | DISCRETE | | | | BOOLEAN |
| | | | | | | |

PROPERTY NAME: ModuleType    ID: 0    DATA TYPE: DISCRETE    DISCRETE PAGE: ModuleType ☑ Enable all MODULES must have this property
☑ Enable Modules can only use this property once
☑ Enable all LINKS must have this property EXPRESSION EDITOR     [NEW]
                      [CHANGE]
                      [DELETE]

[SAVE] [SYNCHRONIZE]  [CLOSE]

JCIT CONTROL 5.2.0

FILE  ACTIONS  HELP

VCUs:

| VCUName | WAVEFORM | STATUS | FREQUENCY |
|---|---|---|---|
| ⊙ VCU000 | Civil Air | | |
| ⊙ VCU001 | Civil Emerg... | | |
| ⊙ VCU002 | Civil Emerg... | | |
| ⊙ VCU003 | Civil Fire | | |
| ⊙ VCU004 | Military Voice | | |

PARAMETERS | LINKS | MISSIONS

| DESCRIPTION | VALUE |
|---|---|
| ☐ MODE | STANDBY |
| ☐ MODULATION | AM_SSBU |
| ☐ RX_FQH | |
| ☐ RX_FREQUENCY | 34000000 |
| ☐ TX_FQH | |
| ☐ TX_FREQUENCY | 34000000 |
| ☐ WAVEFORM_ID | |
| ☐ WAVEFORM_NAME | Civil Fire |

207.86.184.161    DISCONNECTED

[=] JCIT STATUS:

| SOURCE | MODULE TYPE | MODULE REPORTING | MODULE STATUS | VALIDITY |
|---|---|---|---|---|

[=] STATUS/DEBUG:

| TIME | VCUName | TYPE | MESSAGE |
|---|---|---|---|

JCIT CONTROL 5.2.0

FILE  ACTIONS  HELP

VCUs:

| VCUName | WAVEFORM | STATUS | FREQUENCY |
|---------|----------|--------|-----------|
| VCU000 | Civil Air | | |
| VCU001 | Civil Emerg... | | |
| VCU002 | Civil Emerg... | | |
| VCU003 | Civil Fire | | |
| VCU004 | Military Voice | | |

PARAMETERS | LINKS | MISSIONS

| NAME | TYPE |
|------|------|
| CityFireNet | Civil Fire |
| Civil Air | Civil Air |
| Civil Emergency | Civil Emergency |
| Civil Fire | Civil Fire |
| CountryFireNet | Civil Fire |
| Military Intelligence | Military Intelligence |
| Military Voice | Military Voice |

207.86.184.161         DISCONNECTED

JCIT STATUS:

| SOURCE | MODULE TYPE | MODULE REPORTING | MODULE STATUS | VALIDITY |
|--------|-------------|------------------|---------------|----------|
| | | | | |

STATUS/DEBUG:

| TIME | VCUName | TYPE | MESSAGE |
|------|---------|------|---------|
| | | | |

FIG. 11B

FIG. 11C

PROPERTY BASED RESOURCE MANAGER SYSTEM

STATEMENT REGARDING FEDERALLY SPONSORED RESEARCH OR DEVELOPMENT

This invention was made with government support under contracts N-0017398-D-2007 and N-00014-95-C-2044, awarded by the Naval Research Laboratory, and the United States Government has certain rights in this invention.

CROSS REFERENCE TO RELATED APPLICATIONS (Not Applicable)

BACKGROUND OF THE INVENTION

1. Technical Field

This invention relates generally to resource management and more particularly to resource managed electronic systems.

2. Description of the Related Art

Traditionally, electronic and manufacturing systems have been designed and implemented to perform specific pre-defined functions. Such functions have typically been analyzed as part of the system development and design so that the proper resources, e.g. software and hardware are integrated into the final system which are adequate to allow the system to perform the pre-defined function for which it was intended. Significantly, however, as systems have developed a greater degree of microprocessor control and software dependence, there has arisen a potential for greater flexibility in the various functions which may be performed. If the necessary hardware resources are available to the system and proper software is provided, a variety of different functions may be provided using the same equipment. One example of such a system would be a spacecraft or earth satellite for which mission requirements may vary over time. It is desirable in such cases to reconfigure the spacecraft or earth satellite in such case to perform a new function. The need to reconfigure the spacecraft or electronic system in this way may be the result of obsolescence of an older technology or simply the changing functionality needed on a day to day basis. In any case, there exists the potential need to reconfigure the operation of an existing electronic system without exceeding the capabilities of the available resources which comprise the system.

Another type of electronic system which often needs to be reconfigured for varying functions are communications radios. It may be noted that recent developments in radio technology have resulted in continuing advances and ever changing requirements in the field of communications. This is particularly true in the field of certain types of military and civilian communications equipment which must be capable of providing communications using a variety of different air interfaces, tranceive frequencies, modulation techniques, encoding schemes, messaging protocols, and the like. In the past, a variety of purpose built communications equipment has been manufactured to satisfy the needs for each application. Such equipment has typically included a unique combination of various customized RF circuitry, modulation and demodulation components, specialized signal processing components, some form of output driver for communicating with a user and related data processing equipment. Some of these components were implemented as software whereas others have been implemented as hardware. As technology advances, however, it has been found that such systems can quickly become obsolete, requiring the purchase of new equipment necessary to ensure compatibility with state of the art communication systems. Such has been the case with certain cellular telephone technologies, for example. Alternatively, a particular communication system which may be configured for operation in one geographic area and/or service requirement may be unsuitable for use in another geographic area or service requirement due to differences in algorithms used or other system specific issues. Alternatively, a radio may concurrently need to provide one or more different types of communication functions.

One solution which has been proposed to address these issues as concerns communications equipment is the software definable radio (SDR). Such systems would utilize a limited amount of generic radio hardware and related computer processing hardware to implement many of the radio component functions as software algorithms running on special purpose digital processors. General purpose transceivers could then be built that would be capable of downloading any necessary software algorithms or radio component functions, for example, over the airwaves. This new breed of radio would be capable of reconfiguring themselves in this way so as to talk with to any other radio, regardless of its signal format. Theoretically, such radio units would never become obsolete. Significantly, however, in the case of the modern multi-band multi-functional radios which are presently required for many military and commercial applications, the resource management problem which arises in creating or reconfiguring an SDR is complex. Such systems may provide a dozen or more communication links simultaneously for various purposes, each having unique requirements with regard to radio component functionality. For example, required multi-band multi-functional communications terminals, may provide programmable modulation and demodulation, as well as link, network, user interface and message processing capabilities. Each communication link may require certain RF components, antenna interface components, signal processing components, decoding components, encryption algorithms, output drivers, and the like. Moreover, in certain cases, a multi-band multi-functional SDR may need to be reconfigured rapidly to perform a new set of functions. This might occur, for example, in the case of an aircraft communications suite wherein the aircraft is to be used in several different operating areas, for several different missions or for several phases of the same mission. In such cases, a difficulty arises in that the SDR possesses limited resources. For example, the communications terminal may have only a limited number of programmable microprocessors, multi-band transceivers, mass storage units, encryption units, and so on.

When the SDR or any other electronic system such as an earth satellite or spacecraft is to be reconfigured for a new set of mission requirements, it is necessary to provide some means for allocating such resources among the various new functions which are required. In the case of the SDR, resources must be allocated among the various radio communication links which are to be established for a mission. In the case of a spacecraft, the equipment needed to perform various functions must be allocated. In either case, the problem is particularly acute in situations where the equipment needed to perform a particular function or provide a particular communication link must share componentry with other functional blocks or communication links so that all may operate concurrently.

Resource sharing can occur in a variety of ways. For example, a multi-band transceiver can be time or band shared between different communication links. Information security ("infosec") coder/decoder units and message processors can be time shared or multi-tasked to function concurrently for more than one link. RF modules and antenna interface modules can be designed to offer a plurality of RF channels which may be shared among the various virtual communication units which are currently implemented in the SDR. In any case, each virtual communication unit or link will demand a certain portion of a shared module's total available functionality. Significantly, however, the total demands placed on a particular shared module cannot exceed the total available functionality provided by the module.

SUMMARY OF THE INVENTION

An object of the present invention is to provide a resource manager for an electronic system. For convenience, the invention will be described in relation to a resource managed software definable radio (SDR) for providing a desired virtual communication unit or link. However, it should be understood that the resource management system as described herein may be used for any complex reconfigurable electronic or manufacturing system, including for example a spacecraft, earth orbiting satellite or a plurality of factory resources.

In general, the invention concerns a property based decision support system and method for allocating existing resources to implement a functional unit. The system assumes a plurality of resource modules, each providing a component function for implementing a portion of the functional unit and having a set of properties associated therewith. A resource module property object is provided for defining a set of properties for each of the plurality of resource modules and an evaluation expression for each of the properties. A link object defines a set of required modules having required properties associated therewith which are necessary to implement the functional unit. A resource management processor is responsive to a user request for accessing the resource module property object and the link object, and processing the evaluation expression to compare the required properties of each of the required modules to the properties of the plurality of resource modules to determine if the properties of the plurality of resource modules are sufficient to implement functional unit. The processor allocates the resource modules to the functional unit in accordance with the set of required modules defined by the link object if the evaluation expression for each of the required properties is satisfied.

In the case of the SDR, the system has a plurality of resource modules in the form of hardware and/or software, each configured for providing a specific radio component function and having a set of defined properties. A link object is provided for defining a set of required modules, having corresponding properties associated therewith, which are necessary to provide the desired communication function for a particular link. The desired link to be implemented is referred to as a virtual communication unit because it can be assembled from any variety of modules in the SDR which satisfy the requirements of the link object. The link object also preferably defines a list of parameter settings for each of the modules so that each module can be configured as needed for a particular radio link.

The system includes a resource management processor which is responsive to a user request for a virtual communication unit. In effect, this is a request to allocate at least one of the resource modules contained as part of the SDR, to a particular link object in accordance with the set of required modules for the link. The resource manager processor compares the set of required modules to the plurality of resource modules to determine if the modules in the SDR and their corresponding properties can be allocated to satisfy the set of required modules and their corresponding properties. If sufficient module resources are available with the needed properties, the appropriate one or more modules are allocated to the virtual communication unit in accordance with the set of required modules defined by the link object. The resource management processor also advantageously sets a set of module parameters in accordance with the list of parameter settings contained in the link object.

The modules included with the resource managed SDR modules may include software or hardware elements as necessary for performing radio functions to create a particular virtual communication unit or link. Thus, a particular module may be an RF component, antenna interface component, a signal processing component such as a microprocessor and associated software, decoding components, encryption/decryption software or hardware, software or hardware output drivers etc.

According to one aspect of the invention, one or more of the modules included with the SDR has the ability to be shared among two or more links. In order to facilitate this result, a shared resource property is defined for each module. The shared resource property defines the extent to which a module that may be used for one link may also be used to implement another link. Typically, the shared resource property will be defined in terms of a "percentage used" value which may be evaluated relative to a percentage needed value for a particular link to determine if sufficient resources are present to be allocated. This capability is particularly useful in the case of certain limited resources which must be shared among two or more links. The shared resource property of such modules in the present invention is capable of identifying a remaining portion of the module available for allocation, either by indicating the extent that the particular module resource is in use, by specifying the remaining extent of its availability or other suitable means. The module shared resource property is updated by the resource manager processor to reflect the resource availability after modules have been allocated for creating a desired link.

An availability property is also advantageously provided which defines the availability of each particular module which potentially may be allocated to form a particular link. More specifically, the availability property indicates that a particular module is installed and working. Thus, a particular module may have all the necessary properties for it to be used in a particular link, but because of a failure within the module, it may be "unavailable". This feature enables hot insertion of modules while the system is operating, and active re-routing of signals based on module failure. When a status message from a module identifies that the module is no longer "available", a remaining module in the system can be allocated to the link if it possesses all the correct properties, including a suitable shared resource property.

According to another aspect of the invention, the system includes a link building system for creating the link object, defining the set of required radio function modules having corresponding properties associated therewith, and defining the list of parameter setting for each of the modules necessary to provide the desired communication function. In this way, a user can reconfigure the software definable radio as needed, creating new link objects to provide new link functionality while maintaining the ability to manage the resources in an SDR to provide that link and others.

The invention further includes a method for managing resources in a computer controlled software definable radio. The method includes the steps of receiving a request to implement a virtual communication unit for providing a radio link and retrieving from a computer memory a link object for the virtual communication unit. The link object defines a required set of modules and required module properties necessary to implement the virtual communication unit. The computer then retrieves from the computer memory a module resource list which identifies the resource modules which can be allocated to the virtual communication unit and the properties of the resource modules. The required set of modules and required module properties from the link object are processed to determine if the resource modules and the properties of the resource modules are sufficient to implement the virtual communication unit. Finally, the resource modules are assigned to the virtual communication unit if it is determined that the software defined radio has sufficient resources.

According to one aspect of the invention the method further includes the step of updating the module resource list after a resource module has been assigned to the virtual communication unit. The resource module properties include a shared resource property as described above. The shared resource property defines the extent to which a module which may be used for one line may also be used for another link. Typically, the shared resource property will be defined in terms of a percentage used value which may be evaluated relative to a percentage needed value for a particular link to determine if sufficient resources are present to be allocated.

Finally, the link object includes a set of module parameters for at least one module contained in the set of required modules. The method according to the invention further includes the step of setting the module parameters in accordance with the set of module parameters in order for the virtual communication unit to properly function.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 6 is a screen display showing the links editor dialog box in FIG. 5 in a "module" mode in which a set of modules and their required properties can be defined to implement a particular link.

FIG. 7 is a screen display showing the glossary editor dialog box in which a module type glossary page is selected to be edited.

FIG. 8 is a screen display showing the glossary editor dialog box in which the properties used to define the various resource modules can be edited and defined.

FIG. 9 is a screen display showing an expression editor dialog box in which the evaluation function listed in the evaluation column in FIG. 8 can be edited.

FIG. 11 is a series of screen displays showing a user interface to a software defined radio enabled with a resource management system.

DETAILED DESCRIPTION OF THE INVENTION

Figure 1:
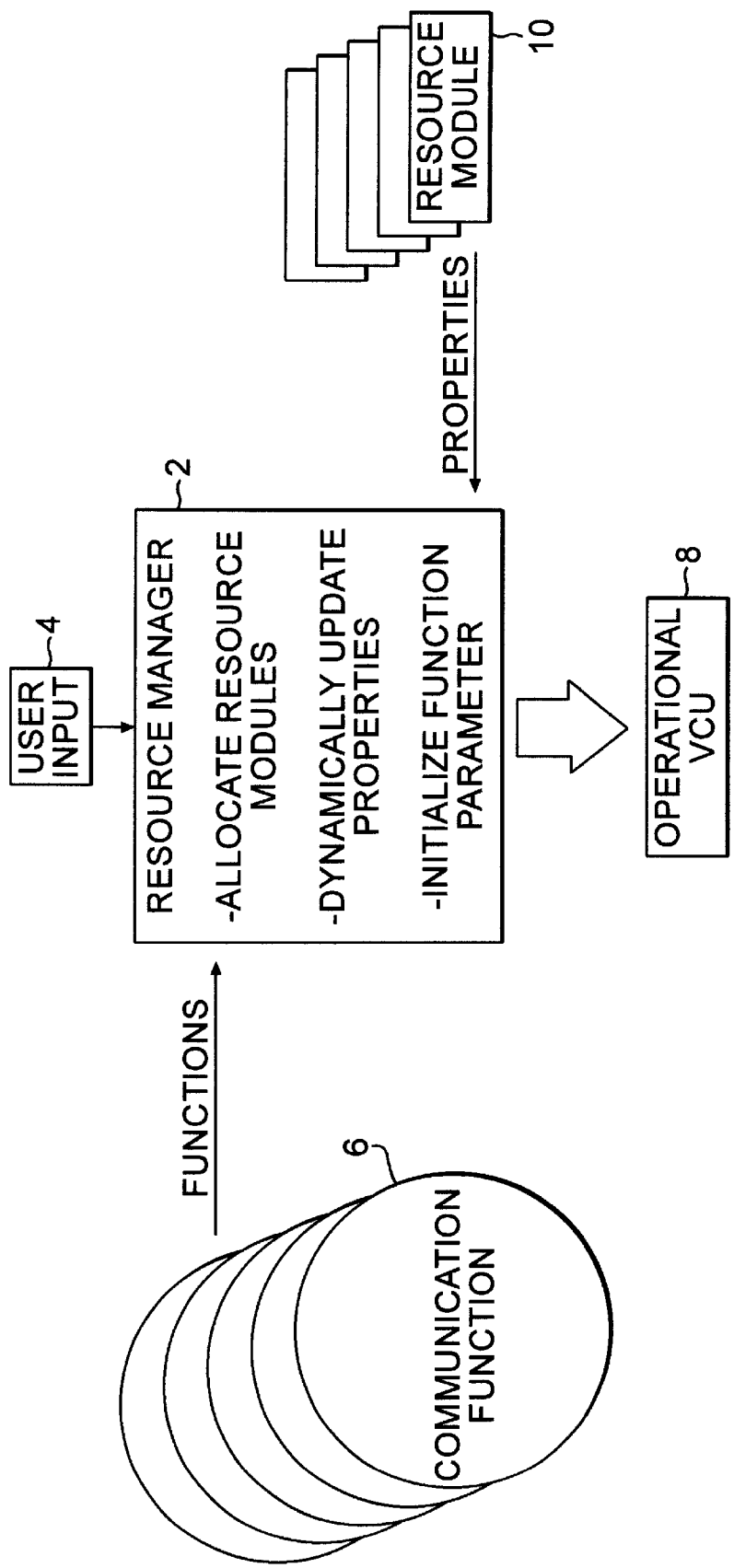
FIG. 1 is a high level block diagram of a resource managed software radio.

FIG. 1 is an abstracted block diagram showing the basic manner in which the resource manager according to the present invention can be used to manage resources in an SDR. As shown in FIG. 1, the resource manager 2 receives commands from user input block 4. The user inputs in the case of the SDR will be commands for various resource management functions including requests to establish an operational virtual communication unit (VCU) 8. The operational virtual communication unit 8 is comprised of a set of system resources modules 10, usually including hardware and software, which together can establish a functioning communication link. Each resource module has a set of properties assigned to it which define its important functional capabilities. The resource modules 10 and the parameters which are needed to establish the operational VCU are defined as a set of communication functions 6 which provide a list of required resource modules and their properties which must be satisfied in order for the operational VCU to be implemented. According to a preferred embodiment of the invention, the communication functions 6 are defined as link objects as shall hereinafter be described in greater detail.

Figure 2:
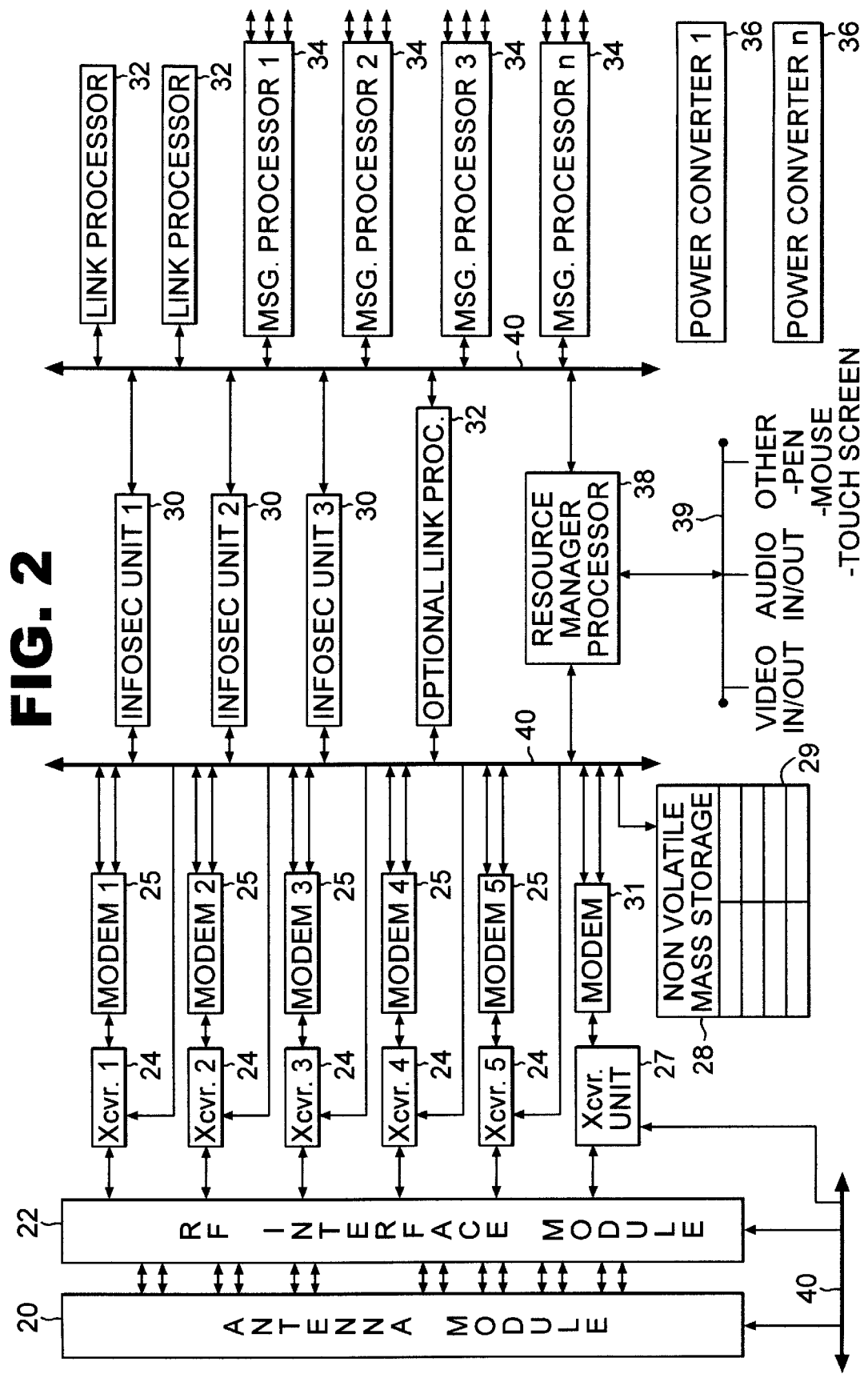
FIG. 2 is a more detailed block diagram of a resource managed software radio.

FIG. 2 shows a resource managed software definable radio (SDR) for providing a plurality of virtual communication units or links. The SDR in FIG. 2 has a plurality of resource modules 10, each configured for providing a specific radio component function and having a set of defined properties. These include hardware elements as necessary for performing radio functions to create a particular virtual communication unit including antenna module 20, RF interface module 22, multi-band transceiver modules 24, modems 25, special band transceiver modules 26, infosec coder/decoder units 30, and message processor modules 34. The special band transceiver module 26 can be any type of special purpose built module designed to perform provide tranceive capabilities. Alternatively, the special purpose module 26 may be a GPS receiver and reference generator. The SDR also may include power supply units such as power converter modules 36. Link processor modules 32 are optionally provided as shown in FIG. 2.

The various modules are preferably microprocessor controlled and communicate with one another via computer bus 40. In addition to such hardware based modules, software modules 29 are also preferably provided. Such modules are stored in a suitable storage medium so they may be accessed and assigned to the various hardware modules by resource manager 38. The software modules 29 may used to perform a variety of radio functions, including functions necessary to implement an air interface, modulation schemes, decoding/ encryption/decryption, message processing, antenna selection and control, and so on. Since these software modules 29 are electronically reproduceable, they do not need to be allocated in the same sense as is necessary for the hardware modules. However, the software module properties are nevertheless important in relation to overall resource management, in determining whether they are available, i.e. present in memory, in a particular instance.

The resource manager processor 38 is provided for controlling the operation and configuration of the resource managed SDR in FIG. 2. The resource manager processor, can be comprised of a computer of the kind which is available from a number of well-known computer manufacturers. Such machines preferably comprise a central processing unit (CPU), including one or more memory devices and associated circuitry. The memory device preferably includes an electronic random access memory (not shown) and a non-volatile mass data storage unit 28.

The CPU used to implement resource manager processor 38 can be comprised of any suitable microprocessor or other electronic processing unit, as is well known to those skilled in the art. An example of such a CPU would include the Pentium brand microprocessor available from Intel Corporation or any similar unit such as an 80486 or 80386 type microprocessor. Alternatively, a suitable microprocessor unit manufactured by Motorola, such as the Power PC 604, can also be used.

In a preferred embodiment, the operating system standard for the resource manager processor 38 is the Portable Operating System (POSIX) and in military applications will preferably make use of Defense Information Infrastructure Common Operating Environment software standards. However, the system is not limited in this regard, and the invention may also be used with any other type of computer operating system.

A suitable user interface 39 is provided to permit a user to control and communicate with the SDR. In one embodiment, the user interface can include an indicating device such as a mouse, pen or touch screen operatively connected to the computer system through suitable interface circuitry. At least one user interface display unit such as a video data terminal (VDT) is preferably operatively connected to the SDR as shown. Further, the user interface 39 can include a voice recognition engine for receiving voice commands from a user and communicating the interpreted voice commands to the resource manager processor 38.

The resource manager processor 38 preferably communicates with non-volatile mass storage device 28 and each of the various modules comprising the SDR by means of computer bus 40. Computer bus 40 is preferably a standard IEEE 1394 type bus. However, it will be appreciated by those skilled in the art that the invention is not limited in this regard and any other suitable computer data bus such as VME or Compact-PCI can also be used for this purpose. The resource manager processor 38 and each of the configurable hardware modules are provided with suitable interfaces for communicating with one another using the IEEE 1394 type bus. Each of the configurable hardware modules preferably have at least one digital interface for permitting them to be controlled and communicate with resource manager processor 38 via computer bus 40.

The modules shown in FIG. 2 are typical of what may be required in a particular SDR unit, but it will be recognized that the block diagram provided is merely one such example and the invention is not intended to be limited in this regard. It will be appreciated that the SDR modules could be designed to a higher or lower level of detail from an architectural standpoint. For example, instead of digitally controlled multi-band transceivers in the case of modules 24, the programmable waveform generators, amplifiers, filtering, and mixing circuitry comprising the transceiver modules could be made available within the SDR as separate module resources to be allocated. Likewise, hardware modules can be replaced by software modules as may be preferred in a particular application. It will be readily appreciated that the resource management invention as described herein can be applied to all manner of electronic systems, including the SDR unit shown in FIG. 2, which have need to allocate and share hardware and software resources for any purpose.

Figure 3:
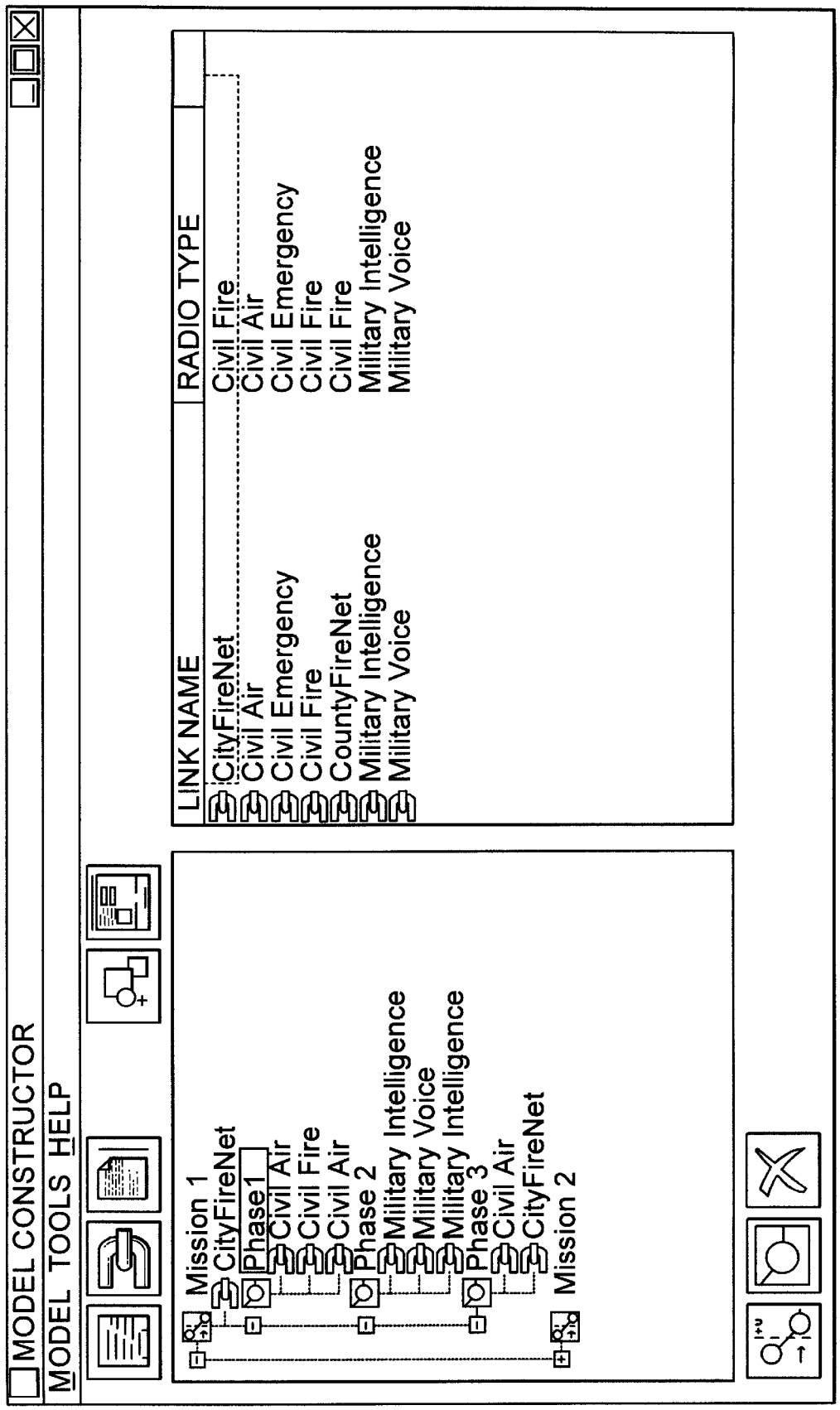
FIG. 3 is a screen display for a model constructor for use with the present invention.

FIG. 3 is a screen display for a model constructor for use with the present invention. In a preferred embodiment of the invention, one or more virtual communication units and their associated link objects which define them are designed and implemented on a development computer system for subsequent use in an SDR. FIGS. 3–11 show a resource management toolkit system for accomplishing this result. This system is preferably designed to execute on a Windows-type operating system such as is available from Microsoft Corporation of Redmond, Washington. However, the system can also be configured to operate on any other suitable operating system such as OSF/Motif. The model constructor screen display in FIG. 3 provides a starting point for this link object development process by permitting the system designer to establish a set of VCU's which will be needed to satisfy a particular mission requirement during the various phases of that mission. Such a phased implementation might be necessary for example in the case of a combat aircraft which is anticipated to proceed through several different mission phases requiring differing communications capabilities as it proceeds to a combat zone. The model constructor screen display in FIG. 3 illustrates a model constructed for two separate missions, namely Mission 1 and Mission 2. Mission 1 is comprised of three separate phases, namely, Phase 1, Phase 2 and Phase 3 as shown. Each mission phase requires certain communication links to be provided by the aircraft's SDR communication suite. For example, in Phase 2 of Mission 1 two "Military Intelligence" and one "Military Voice" communication links are specified. Each link specified indicates that resources will need to be allocated from the SDR on the aircraft to create a VCU to provide that communication link.

Figure 4:
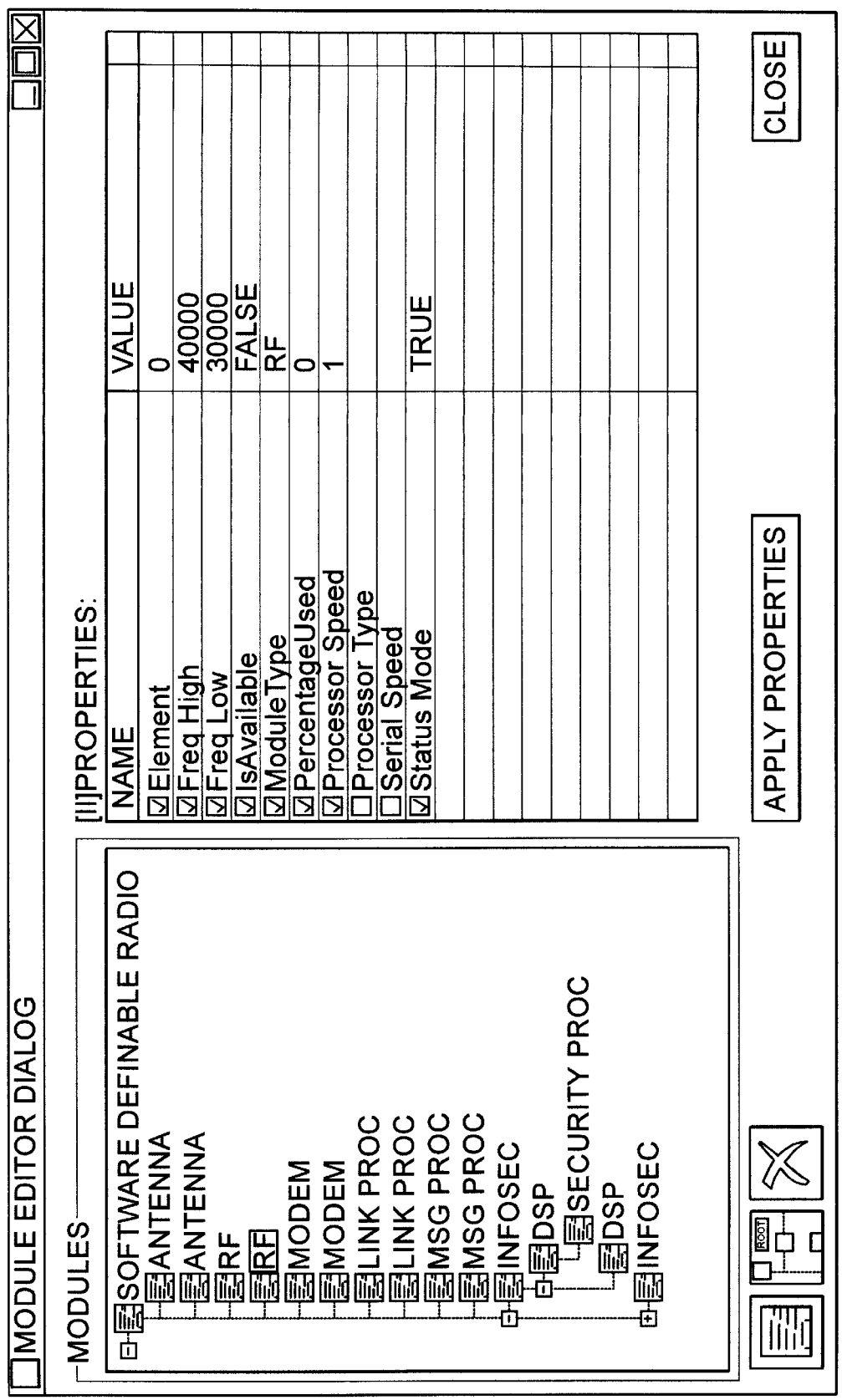
FIG. 4 is a screen display showing a module editor dialog box for assigning module properties.

FIG. 4 is a screen display showing a module editor dialog box for assigning module properties for particular resources contained within an SDR. In order to allocate a set of resource modules which exist in a particular type SDR, the properties of the various modules must be defined and understood by the resource manager system. Moreover, when a hardware or software resource module in an SDR such as shown in FIG. 2 reports its availability to resource manager processor 38, such module may not be configured to provide all of its associated property data. As such, the property data for each resource module is preferably predefined in the manner shown in FIG. 4 as part of the VCU design process. The screen display in FIG. 4 shows on one side a hierarchical list of modules for an SDR which contains modules similar to the SDR contained in the block diagram in FIG. 2. However, for convenience and clarity, the hierarchical model for the SDR in FIG. 4 is simplified as compared to the SDR shown in FIG. 2. Accordingly, it may be noted that the list of resource modules in FIG. 4 does not precisely correspond to the various modules shown in FIG. 2.

In FIG. 4, the RF module listed in hierarchical list is shown highlighted, with the result that the properties for that particular module are illustrated on the right hand side of the screen. The properties listed are those necessary to sufficiently define the various available module resources for the purposes of resource allocation. In the case of the RF module shown, the appropriate boxes have been checked adjacent to those properties which are applicable. Further, in the "Value" column adjacent to the property list, specific property values are inserted where appropriate. The Value for a particular property may have a defined meaning, or may be a boolean operator, a fixed numerical value or a range of values. Thus, for example, the Value for the ModuleType property in FIG. 4 is RF, signifying that the referenced module is an RF module type. In the case of the IsAvailable property, the value is a boolean operator indicating by means of a 1 or 0 whether or not a particular module is present and working. Values inserted for the Freq High and Freq Low properties identify the high and low range of the RF module in this instance. The properties shown in FIG. 4 are of course exemplary for the particular resources to be managed in this instance. In this regard, it will be understood by those skilled in the art that any set of properties may be selected in a particular instance as may be necessary to define a set of modules for the purposes of resource allocation. In FIG. 4, new modules may be added or removed to the hierarchical list shown by graphical user interface control panel buttons as shown.

Figure 5:
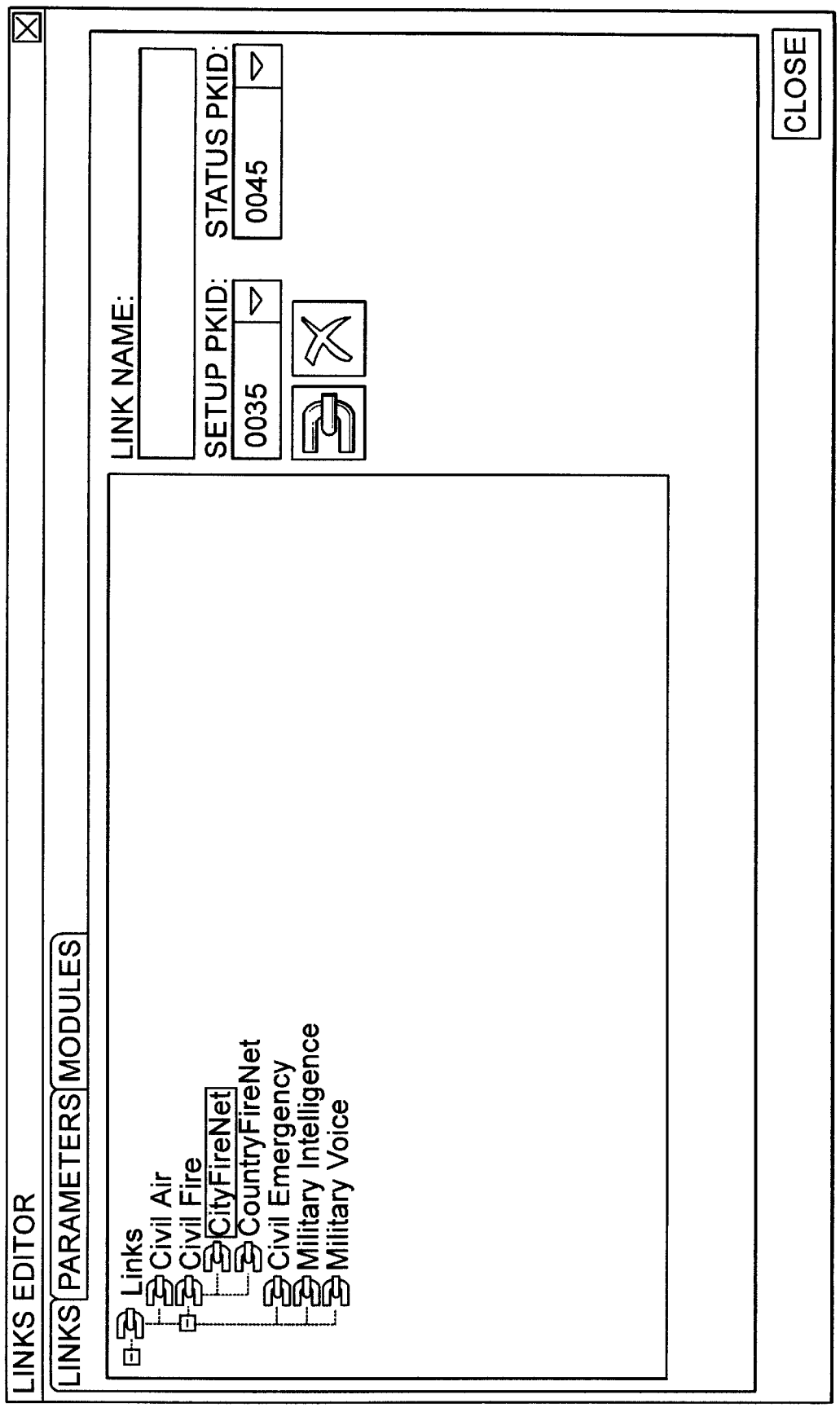
FIG. 5 is a screen display showing a links editor dialog box in a "link" mode in which a link can be defined.

FIG. 5 is a screen display showing a links editor dialog box in a "link" mode in which a link object can be defined for specifying the resources needed to implement a VCU. The link mode is selected in FIG. 5 by selecting the Links tab near the top of the screen. In FIG. 5, various links are shown which correspond to those identified in the model constructor screen display of FIG. 3. New links can be added or deleted here as necessary by using graphical user interface control panel buttons as shown. In FIG. 5, the CityFireNet link is highlighted. By selecting the Module tab at the top of the screen, the display screen will transition to the Links Editor dialog box shown in FIG. 6.

FIG. 6 is a screen display showing the links editor dialog box in FIG. 5 in a "module" mode in which a set of modules and their required properties which are necessary to implement a particular link or virtual communications unit can be assembled. In FIG. 6, the link or VCU being designed is the Civil Fire link which was previously identified in FIG. 3. In the list box entitled "Needed Modules" in FIG. 6, there is set forth a list of modules which are necessary to implement the Civil Fire link. The properties for each of the various modules as previously defined in relation to FIG. 4, now appear in the "Properties" list box in FIG. 6 for each module selected.

In FIG. 6, the module selected is the RF module and the required properties for the module which are necessary to implement the Civil Fire link are set forth. In particular, the required frequency range (Freq High, Freq Low) is identified, as well as the Module Type. Moreover, the value for the PercentageUsed property is indicated to be 100, meaning that one hundred percent (100%) of the modules capabilities will be required in order to properly implement the link. The PercentageUsed property in this instance reflects that the particular RF module required cannot be shared with any other communication link. Finally, the IsAvailable property is set to TRUE, meaning that the module must report that it is available in order for it to be used for this link. A similar process is performed in relation to the other modules listed in the "Needed Modules" list box in FIG. 6, until the module properties for each required resource module has been identified.

FIG. 7 is a screen display showing the Glossary Editor dialog box in Glossary Page Editor mode. In FIG. 7, the Module Type glossary page is selected from the Glossary Pages list box. When the Module Type glossary page is selected, all of the various different types of modules are shown in the adjacent Page Definitions list box. Likewise, when a different glossary page is selected, the corresponding page definitions for that Glossary Page will be displayed.

Figure 9:
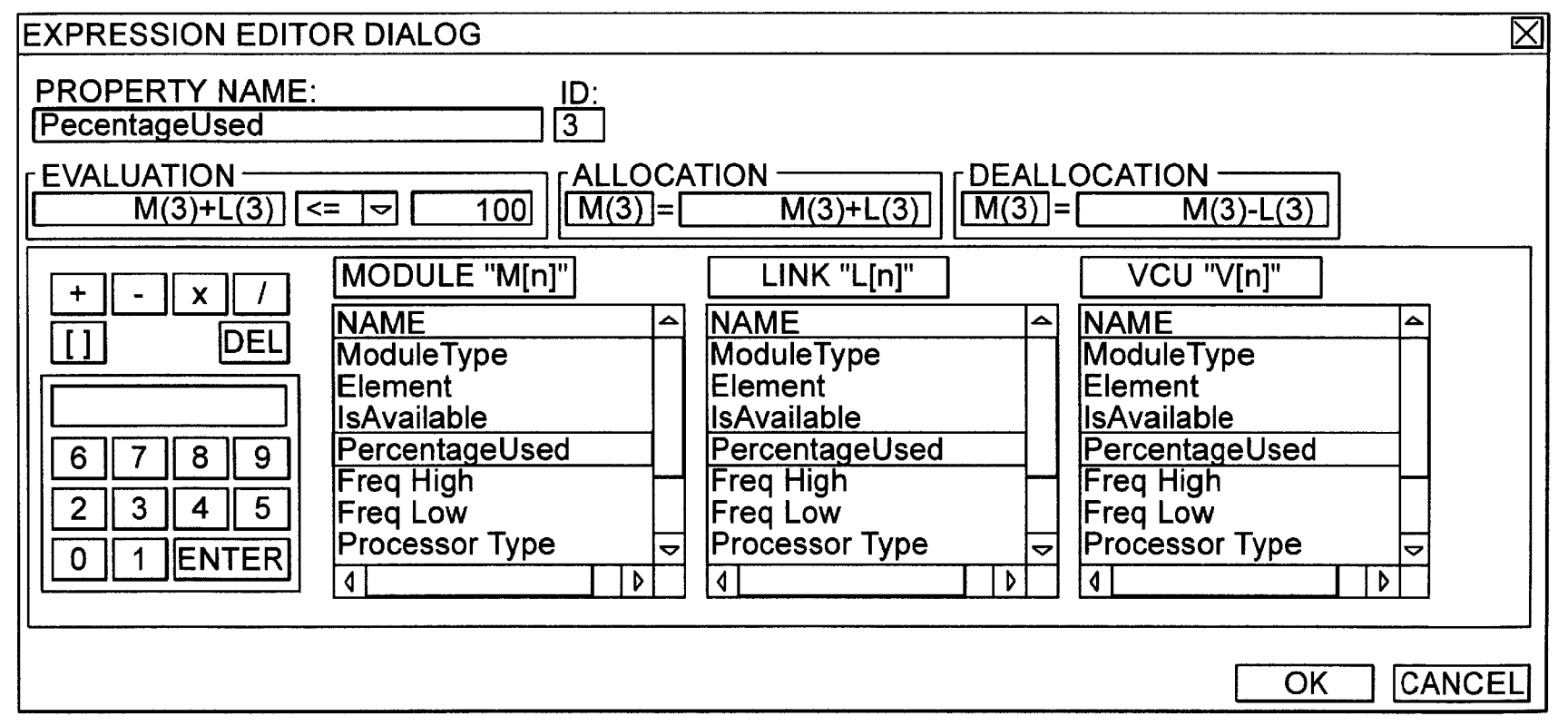

FIG. 8 is a screen display showing the Glossary Editor dialog box of FIG. 7, now in Properties Editor mode. In this mode, the definitions, evaluation processes, allocation and deallocation methodology, and value types are expressed for each of the various properties defined for the resource modules. Thus, for example, in the case of property "ModuleType" shown in the first line of the list box, it will be noted that the property ID is "0" and the Data Type is Discrete. The evaluation methodology set forth in the Evaluation column indicates that the M[0]==L[0], meaning that for the purpose of evaluating whether this property is satisfied, the resource manager must determine that the module type property of the resource module matches exactly the module type property called for in the link object. As another example, the evaluation methodology for the PercentageUsed property indicates the sum of the property value for the resource module and the property specified in the link object must not exceed 100 or one hundred percent. If the particular module is allocated for a particular VCU by the resource manager, the allocation process set forth in the Allocation column indicates that the new PercentageUsed property value will be equal to the original value M[3] plus the value of the property required as set forth by the link object L[3]. When the resource module is deallocated, the process reverses and the new PercentageUsed value is calculated to be the present value less the value for the PercentageUsed property set forth by the link object. The Expression Editor dialog box in FIG. 9 is provided for to aid in developing the correct expression for each type of property in the Evaluation, Allocation and Deallocation columns in FIG. 8.

Figure 10:
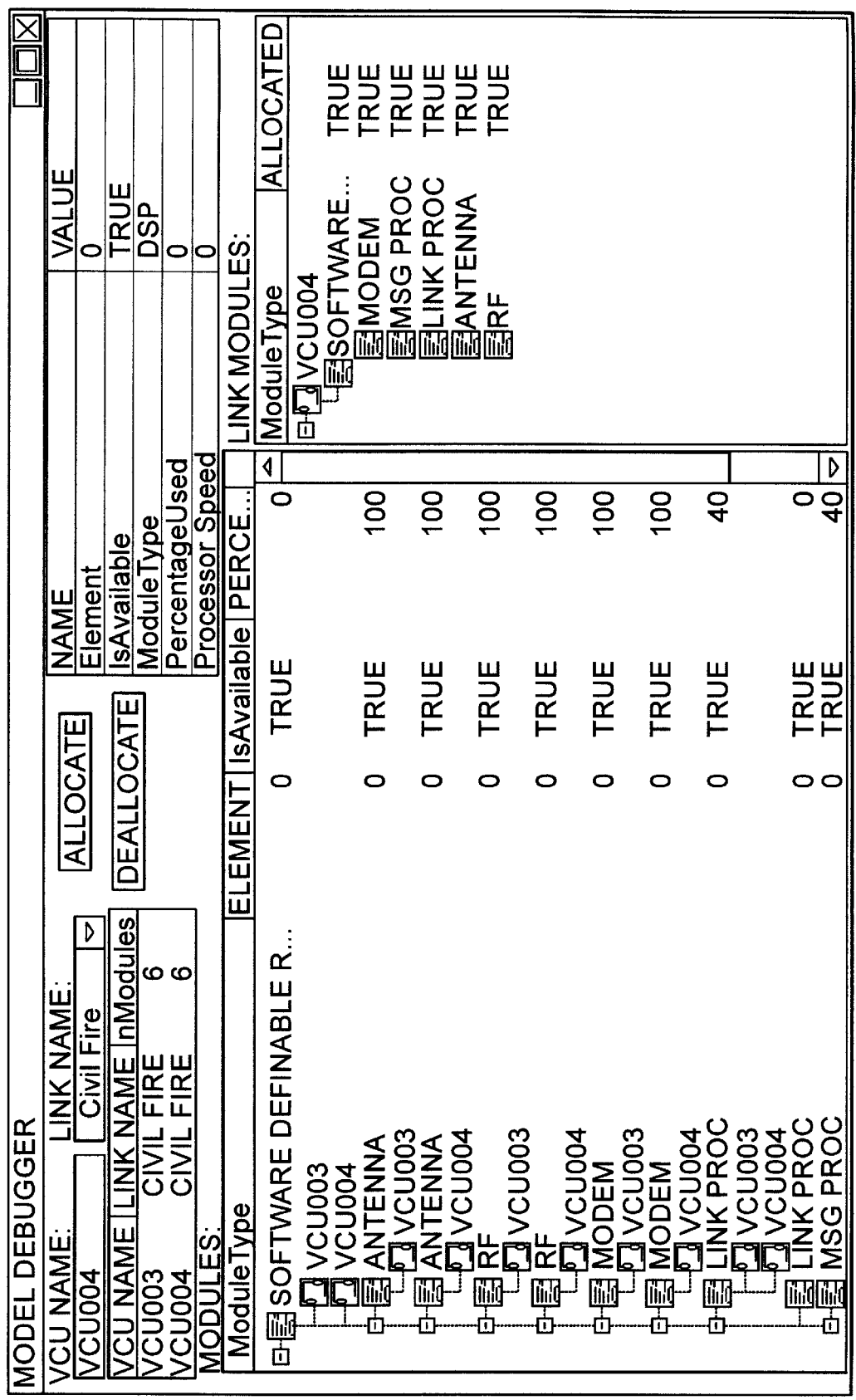
FIG. 10 is a screen display showing the model debugger dialog box in which a model for a link object can be evaluated against a simulated electronic communication system.

FIG. 10 is a Model Debugger to aid the VCU developer in verifying that the link object which has been developed specifies a VCU for which resources are in fact available. As shown in FIG. 10 in the Modules list box on the right side, each module necessary to implement one instance of the Civil Fire link as VCU004 has been successfully allocated. This fact is reflected by the fact that the IsAvailable property column shows true for all the modules which have been allocated, indicating that all the necessary modules are present and working. For the purposes of the Model Debugger, it should be noted that all modules will normally have their IsAvailable property set to TRUE. The sufficiency of the resources with regard to sharing of modules is reflected in the adjacent Link Modules list box which shows TRUE for all of the modules allocated. In other words, a true indication here informs the designer that not only are the modules available, but the percentage to which they are used is such as to permit the allocation of such resources to the VCU004 link.

The screen displays in FIGS. 3–10 all are used in the development of the link object which defines a particular VCU to be created from an existing SDR. By comparison, FIG. 11 is a set of interface screens for the actual SDR unit in which the link object may be used to create a VCU. In FIG. 11, the currently existing VCU's are set forth in the list box entitled VCUs on the left hand side of the screen. In FIG. 11A, the adjacent screen entitled Parameters is set to show the VCU parameter values. The parameters are preferably also contained within the link object for the particular VCU and are primarily used to apply certain VCU specific settings to the VCU hardware and software. In FIG. 11A these include modulation type, front panel receive and transmit frequency settings and so on. These predetermined parameter values are typically selected by the VCU designer as part of the link object development process.

Figure 11C:
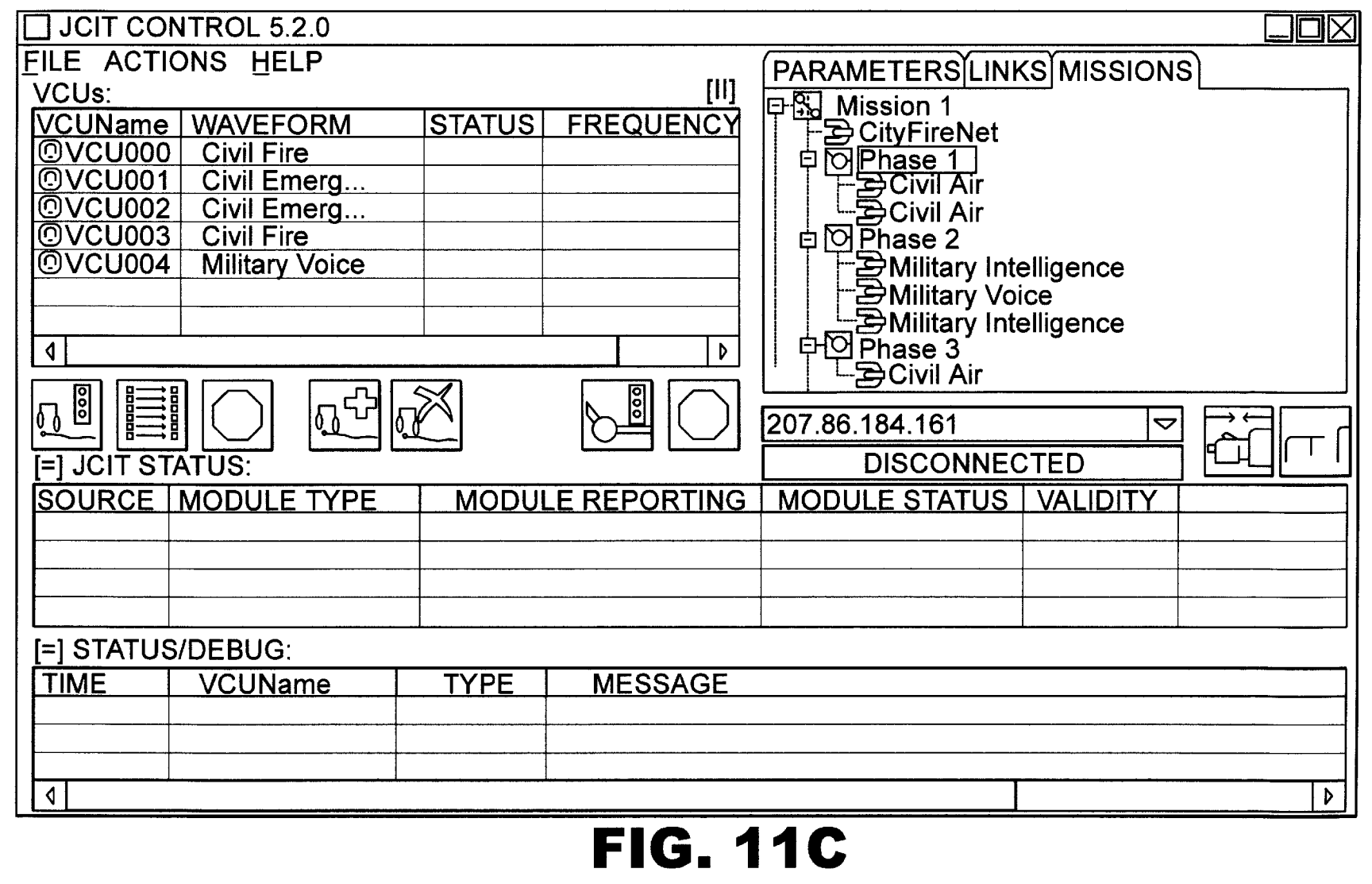

FIG. 11B shows the same SDR control panel as in FIG. 11A except that the available link objects are displayed in the list box entitled Links. The items listed here are the available link objects for implementing the VCUs as identified in such box. In order to create one of the VCUs listed, a SDR user can use a suitable pointing device to drag the desired link object from the Links list box in FIG. 11B to the adjacent VCUs list box. When this occurs, the embedded resource management processor 38 would proceed to allocate to the link object the necessary resource modules to implement the VCU. If the necessary resources are available, the VCU will be thereafter be established. However, if module failures exist or existing resource allocations to other VCUs have left insufficient module resources available to implement the new VCU, the resource manager will determine such fact and will report that the VCU could not be created due to insufficient resources. FIG. 11C illustrates that the mission models as described relative to FIG. 3 can be made available to the SDR such that multiple VCUs can be selected and implemented by selecting a mission phase, including all of the associated VCU's listed for that particular phase, and using a pointing device to drag the selected items to the VCUs list box.

Figure 12A:
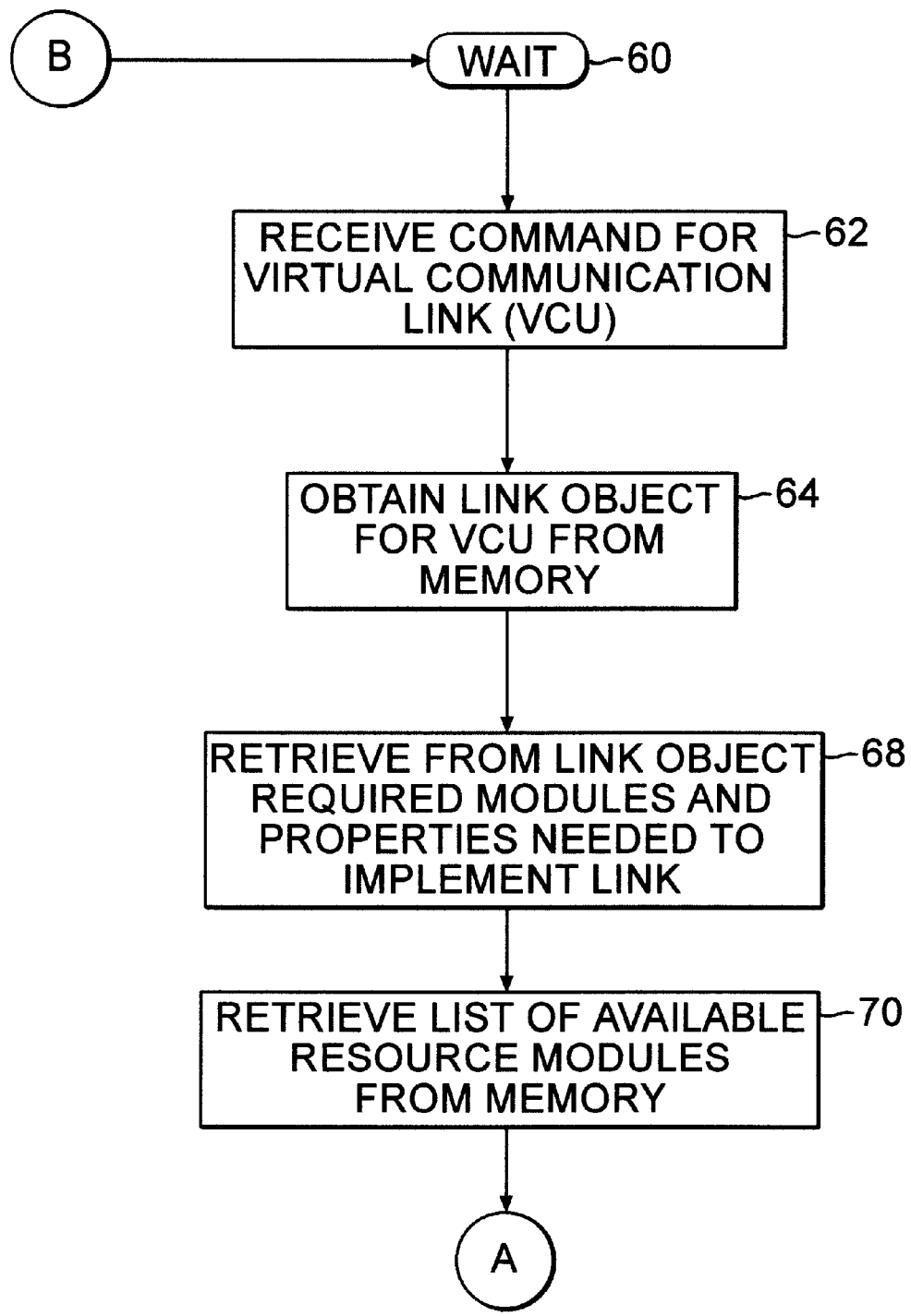
FIG. 12 is a flowchart showing a process according to the present invention.
Figure 12B:
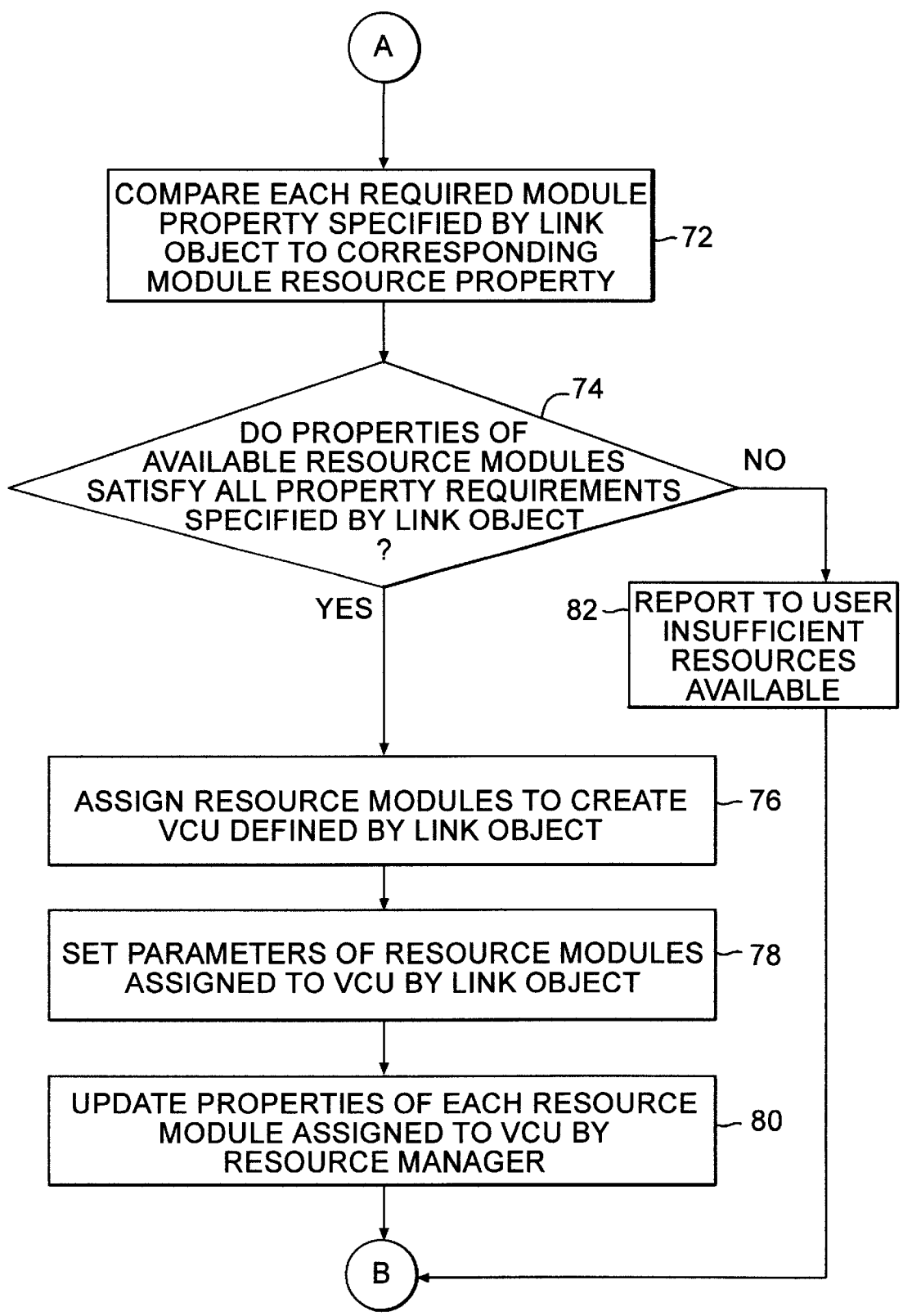

FIG. 12 is a flow chart which illustrates the process by which the resource manager processor 38 proceeds to attempt to allocate resource modules to a new VCU when requested to do so by a user as described relative to FIG. 11B. In step 60, the resource manager processor waits for a user command to create a new VCU. A command to implement a VCU is received in step 62 in the manner previously described in relation to FIG. 11B. In step 64, the link object is retrieved from a memory location, typically non-volatile mass storage unit 28. In step 68, the resource manager 38 extracts from the link object the necessary module and property information. Next begins the process of comparing the properties of available resource modules to those specified in the link object, using the evaluation methodology and expressions discussed relative to FIG. 8. In step 70, a list of available resource modules is retrieved from memory.

The list of available resource modules is preferably created by the resource manager. Upon power up, and also preferably at periodic intervals, each resource module reports to the resource manager 38 that it is available, meaning that it is present and working. The resource manager uses this information to maintain the list of available resource modules. Significantly, it is not necessary for the resource modules to report any property information beyond the fact that they are available, since all of the module definitions for the SDR have been pre-defined as discussed relative to FIG. 4, and are preferably stored in the resource manager memory. In an alternative embodiment, it will be recognized that resource modules for the SDR could be configured to report all property data to the resource manager on a periodic basis such that the resource manager processor receives real time property data for each resource module. This would eliminate the need to pre-define the modules associated with a particular SDR.

If an available module subsequently fails it will report that it is unavailable or will not report that it is available. In either case, the resource manager will preferably thereafter reallocate the remaining modules to maintain each existing VCU, if sufficient resources are available to do so. In this regard, it may be noted that the resource management system according to the present invention will provide automatic rerouting around failed modules and facilitates hot installation and removal of modules. Newly installed modules will automatically report their availability to the resource manager 38.

In step 72 of FIG. 12, the resource manager processor compares each required module property specified by the link object to its corresponding module resource property in accordance with the evaluation expressions set forth in FIG. 8. In step 74 the resource manager processor determines whether each evaluation expression is satisfied. If the resource module properties do not satisfy all of the module properties specified by the link object, the resource manager reports to the user in step 82 that insufficient resources are available. Alternatively, if the resource module properties do satisfy all of the module properties specified by the link object, the resource manager will proceed in step 76 to assign the available resource modules to create the VCU defined by the link object. In step 78, the parameters of the resource modules assigned to the VCU by the link object are set for the appropriate modules. These would include certain VCU specific items such as transmit and receive frequencies, modulation settings, and so on. Finally, in step 80 the properties of the allocated resource modules are updated in accordance with the allocation expressions shown and described relative to FIG. 8. A similar updating of the module properties occurs when a VCU is no longer needed and modules are deallocated. This updating of module properties typically will be most relevant as concerns the PercentageUsed property as each allocation or deallocation of a module will have a direct effect on the PercentageUsed property. However, depending on the circumstances, other module properties may require updating as well.

It will be recognized by those skilled in the art that the resource manager system as described herein relative to SDRs can also be applied to solve a wide variety of other resource management applications. In such instances, the VCU as described herein would be redefined as the specific virtual function required for a particular application. For example, the required virtual function may be an earth orbiting satellite research, surveillance or data collection function instead of the communication link function performed by the VCU as describe herein. In the case of the earth orbiting satellite, the resource modules might be computers, cameras, sensors, and communication equipment. Alternatively, the required function may be a manufacturing or assembly function. In that instance, the resource modules as described herein could be assembly line robots, equipment, personnel, parts, or the like. In any such instance, the resource management system as described could be applied to allocated and deallocate resources to achieve a desired result.

We claim:

1. A property based decision support system for allocating existing resources to implement a functional unit, comprising:
   a plurality of resource modules, each resource module providing a component function for implementing a portion of said functional unit and having a set of properties associated therewith;
   a resource module property object for defining a set of properties for each of said plurality of resource modules and an evaluation expression for each of said properties;
   a link object defining a set of required modules having required properties associated therewith which are necessary to implement said functional unit;

resource management means responsive to a user request for accessing said resource module property object and said link object, and processing said evaluation expression to compare said required properties of each of said required modules to said properties of said plurality of resource modules to determine if said properties of said plurality of resource modules are sufficient to implement said functional unit; and means for allocating at least one of said resource modules to said functional unit in accordance with said set of required modules defined by said link object if said evaluation expression for each of said required properties is satisfied.

2. The property based decision support system according to claim 1 wherein said resource module property object further defines an allocation expression and a deallocation expression for at least one of said resource module properties.

3. The property based decision support system according to claim 2 further comprising means for updating said at least one resource module property in accordance with at least one of said allocation expression and said deallocation expression after said at least one resource module has been allocated or deallocated by said resource manager.

4. The property based decision support system according to claim 1 wherein said functional unit is a virtual communications unit in a software definable radio.

5. The property based decision support system according to claim 4 wherein said resource modules are resources of said software definable radio, each resource module providing a radio component function.

6. The property based decision support system according to claim 1 wherein each of said resource modules is selected from a group consisting of software and hardware components.

7. The property based decision support system according to claim 1 further comprising means for updating at least one of said properties of each of said resource modules after said resource module has been allocated to said unit.

8. The property based decision support system according to claim 7 wherein said at least one property which is updated identifies a portion of said resource module which has been allocated.

9. The property based decision support system according to claim 8 wherein said at least one property which is updated identifies a percentage extent to which said resource module has been allocated.

10. The property based decision support system according to claim 1 wherein each of said resource modules has a percentage used property, said percentage used property defining the portion of said resource module which has been allocated.

11. The property based decision support system according to claim 1 wherein at least one of said resource modules is configured to be allocated concurrently to more than one functional unit.

12. The property based decision support system according to claim 1 wherein each of said resource modules has an availability property for indicating that a module is installed and working.

13. The property based decision support system according to claim 1 wherein said link object further defines a set of module parameters for at least one of said required modules and further comprising means for controlling said resource modules in accordance with said set of module parameters to implement said functional unit.

14. The property based decision support system according to claim 1 further comprising functional unit building means for creating said link object.

15. The property based decision support system according to claim 14 further comprising means for creating said evaluation expression for each said resource module property for evaluating whether each said resource module property satisfies each said required module property identified by said link object.

16. The property based decision support system according to claim 15 further comprising means for creating an allocation expression and a deallocation expression for updating each of said resource module properties after a module has been allocated or deallocated by said resource manager.

17. The property based decision support system according to claim 14 further comprising means for defining a list of parameter setting for controlling each of said resource modules to provide said desired functional unit.

18. A method for managing resources in a computer controlled electronic system to implement a functional unit, said method comprising the steps of:

receiving from a computer user interface a request to implement said functional unit;

retrieving from a computer memory a link object for said functional unit, said link object defining a required set of modules and required module properties necessary to implement said functional unit;

retrieving from said computer memory a module resource object, said module resource object defining resource modules which can be allocated to said functional unit, the properties of said resource modules, and an evaluation expression for each of said properties;

processing said evaluation expression defined for each property to compare said required properties of each of said required modules to said properties of said plurality of resource modules to determine if said properties of said plurality of resource modules are sufficient to implement said functional unit; and allocating at least one of said resource modules to said functional unit in accordance with said set of required modules and required properties defined by said link object if said evaluation expressions are satisfied.

19. The method according to claim 18 further comprising the step of retrieving from said resource module property object an allocation expression and a deallocation expression for at least one of said resource module properties.

20. The method according to claim 19 further comprising the step of updating said at least one resource module property in accordance with at least one of said allocation expression and said deallocation expression after said at least one resource module has been allocated or deallocated by said resource manager.

21. The method according to claim 20 wherein said at least one property which is updated identifies a percentage portion of said resource module which has been allocated.

22. The method according to claim 18 further comprising the step of allocating at least one of said resource modules to more than one functional unit.

23. The method according to claim 18 further comprising the step of evaluating an availability property for a resource module to determine whether a resource module is installed and working.

24. The method according to claim 18 further comprising the step of defining in said link object a set of module parameters for at least one of said required modules and setting a control of said at least one resource module in accordance with said set of module parameters to implement said functional unit.

25. A machine readable storage, having stored thereon a computer program having a plurality of code sections executable by a machine for causing the machine to perform the steps of:

receiving from a computer user interface a request to implement a functional unit;

retrieving from a computer memory a link object for said functional unit, said link object defining a required set of modules and required module properties necessary to implement said functional unit;

retrieving from said computer memory a module resource object, said module resource object defining resource modules which can be allocated to said functional unit, the properties of said resource modules, and an evaluation expression for each of said properties;

processing said evaluation expression defined for each property to compare said required properties of each of said required modules to said properties of said plurality of resource modules to determine if said properties of said plurality of resource modules are sufficient to implement said functional unit; and allocating at least one of said resource modules to said functional unit in accordance with said set of required modules and required properties defined by said link object if said evaluation expressions are satisfied.

* * * * *